US009117127B2

(12) United States Patent
Jung et al.

(10) Patent No.: US 9,117,127 B2
(45) Date of Patent: Aug. 25, 2015

(54) RADIO FREQUENCY SWITCH AND METHOD FOR CONTROLLING THE SAME, AND RADIO FREQUENCY IDENTIFICATION SMART SHELF SYSTEM

(75) Inventors: Jae-young Jung, Daejeon (KR); Won Kyu Choi, Daejeon (KR); Kyu Won Han, Seoul (KR); Chan-Won Park, Daejeon (KR); Jong-Suk Chae, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 281 days.

(21) Appl. No.: 13/605,510

(22) Filed: Sep. 6, 2012

(65) Prior Publication Data
US 2013/0154804 A1    Jun. 20, 2013

(30) Foreign Application Priority Data
Dec. 15, 2011    (KR) .................. 10-2011-0135635

(51) Int. Cl.
*H04Q 5/22* (2006.01)
*G06K 7/10* (2006.01)
*G06K 17/00* (2006.01)

(52) U.S. Cl.
CPC .... *G06K 7/10356* (2013.01); *G06K 2017/0051* (2013.01)

(58) Field of Classification Search
CPC ............ G06K 7/008; G06K 19/07749; G06K 19/0723
USPC ............ 340/10.1–10.6, 12.5, 1.51, 658, 13.1, 340/870.25; 455/41.1, 106; 343/778
See application file for complete search history.

(56) References Cited

U.S. PATENT DOCUMENTS

| 2006/0220870 | A1* | 10/2006 | Kimura ....................... 340/572.7 |
| 2007/0207732 | A1* | 9/2007 | Rofougaran et al. ......... 455/41.1 |
| 2008/0080550 | A1* | 4/2008 | Malik ............................ 370/465 |
| 2009/0231140 | A1 | 9/2009 | Hong et al. |
| 2010/0259364 | A1* | 10/2010 | Man ............................. 340/10.1 |
| 2011/0187533 | A1 | 8/2011 | Frank et al. |

FOREIGN PATENT DOCUMENTS

KR    10-2009-0085910 A    8/2009

* cited by examiner

*Primary Examiner* — George Bugg
*Assistant Examiner* — Anthony D Afrifa-Kyei
(74) *Attorney, Agent, or Firm* — Rabin & Berdo, P.C.

(57) ABSTRACT

A radio frequency identification (RFID) smart shelf system manages a product through communication with an RFID tag that is attached to the product on a shelf, and includes an RFID reader, a plurality of reader antennas, and an RF switch that is connected between the RFID reader and the plurality of reader antennas. The RF switch periodically varies a phase difference between RF signals of a portion of a plurality of output connection ports that set a connection to each of the plurality of reader antennas.

18 Claims, 11 Drawing Sheets

RADIO FREQUENCY SWITCH AND METHOD FOR CONTROLLING THE SAME, AND RADIO FREQUENCY IDENTIFICATION SMART SHELF SYSTEM

CROSS-REFERENCE TO RELATED APPLICATION

This application claims priority to and the benefit of Korean Patent Application No. 10-2011-0135635 filed in the Korean Intellectual Property Office on Dec. 15, 2011, the entire contents of which are incorporated herein by reference.

BACKGROUND OF THE INVENTION (a) Field of the Invention

The present invention relates to a radio frequency switch, a method of controlling the same, and a radio frequency identification smart shelf system.

(b) Description of the Related Art

In general, in a radio frequency identification (RFID) system, a tag is attached to an object, and a reader recognizes an intrinsic identifier of the tag that is attached to the object, and thus various services such as positioning and remote processing and management of the object and information exchange between objects can be provided. Such an RFID system is a non-contact recognition system and thus does not require direct contact of a reader to a tag or to scan in a visible band. Thereby, an RFID system is evaluated as technology to replace a barcode, which is a contact recognition system, and a use range of the RFID system has been increased.

The RFID system uses several frequency bands, such as a low frequency (30 kHz-500 kHz), a high frequency (850-950 MHz), or 2.45-2.5 GHz. An RFID system of a low frequency band may be used at a short distance of 1.8 m or less, and an RFID system of a high frequency band may be used at a far distance of 10 m or more. That is, the RFID system recognizes information of a tag within several meters by connecting an antenna to a reader and processes data thereof.

Such an RFID system is widely applied to a smart shelf. In an RFID smart shelf system, by applying an RFID system to a shelf that uses in a display stand or a product warehouse, a reader recognizes a tag that is attached to a product that is put on the shelf and provides information about the product to a user, and thus real-time stock management is easily performed. However, when a tag is attached to a product in which tag data recognition is weak like a metal or a liquid or when a weak radio area occurs due to a dense environment between tags, if a reader recognizes a plurality of tags that are exhibited on a smart shelf, a tag in which recognition is omitted may occur. In order to solve such a problem, conventionally, in some application fields, a method of shaking a product to which a tag is attached is suggested, but the shaking method cannot be used to a product that is exhibited in a smart shelf such as medical supplies.

SUMMARY OF THE INVENTION

The present invention has been made in an effort to provide a radio frequency switch and a method of controlling the same having advantages of improving a recognition rate when a reader recognizes a tag that is attached to a product that is exhibited on a smart shelf.

The present invention has been made in an effort to further provide an RFID smart shelf system having advantages of managing a plurality of smart shelves on which a large number of products are exhibited through the minimum number of RFID reader.

An exemplary embodiment of the present invention provides a radio frequency (RF) switch that is connected between an RFID reader and a plurality of reader antennas. The RF switch includes a first input connection port, a second input connection port, a plurality of output connection ports, a plurality of switching modules, and a plurality of phase converters. The first input connection port sets a connection to the RFID reader. The second input connection port sets a connection to another RF switch. The plurality of output connection ports set a connection to a plurality of reader antennas, respectively. The plurality of switching modules transfer an RF signal of the RFID reader to a designated reader antenna of the plurality of reader antennas. The plurality of phase converters are each connected to a portion of the plurality of output connection ports to convert phases of RF signals of corresponding output connection ports.

The RF switch may further include a phase controller. The phase controller may control the plurality of phase converters in order to periodically convert a phase difference between an input and an output of the RF signals of the portion of output connection ports.

The RF switch may further include a power divider. The power divider may branch an RF signal from at least one of the plurality of switching modules with the same power and output the RF signal to the portion of output connection ports.

The RF switch may further include a power unit. The power unit may supply power to the RF switch through the RF signal that is received from the RF reader.

Another embodiment of the present invention provides a method of controlling communication between an RFID reader and a plurality of reader antennas in an RF switch that is connected between one antenna port of the RFID reader and the plurality of reader antennas. The method includes transmitting an RF signal by opening at least one first output connection port of a plurality of output connection ports that provide a connection to the plurality of reader antennas closing the at least one first output connection port, transmitting an RF signal by opening at least one second output connection port of the plurality of output connection ports, and closing the at least one second output connection port.

The transmitting of an RF signal by opening at least one first output connection port may include periodically varying a phase difference between an input and an output of an RF signal of the at least one first output connection port.

The transmitting of an RF signal by opening at least one second output connection port may include periodically varying a phase difference between an input and an output of an RF signal of the at least one second output connection port.

The method may further include, before the transmitting of an RF signal by opening at least one first output connection port: setting an initial default identifier to a switch identifier according to an initial setting request including the switch identifier from the RFID reader; determining a reader antenna that is connected to the RF switch through antenna sensing; and transmitting an identifier of a reader antenna that is connected to the RF switch and information of an output connection port that provides a connection to the reader antenna to the RFID reader.

The periodically varying of a phase difference may include differently setting a phase difference between RF signals of the at least one first output connection port or the at least one second output connection port, and transmitting the RF signal through the at least one first output connection port or the at least one second output connection port.

Yet another embodiment of the present invention provides an RFID smart shelf system that manages a product through communication with an RFID tag that is attached to a product on a shelf. The RFID smart shelf system includes a plurality of reader antennas, an RFID reader, and a plurality of RF switches. The plurality of reader antennas are mounted on the shelf. The RFID reader includes at least one antenna port and receives information of the product through communication with the RFID tag. The plurality of RF switches transmit and receive an RF signal between one antenna port of the RFID reader and the plurality of reader antennas, and are sequentially connected between one antenna port of the RFID reader and the plurality of reader antennas.

The plurality of RF switches may each include: a first input connection port that sets a connection to the RFID reader; a second input connection port that sets a connection to another RF switch; a plurality of output connection ports that each set a connection to a portion of the plurality of reader antennas; a plurality of switching modules that transfer the RF signal of the RFID reader to a designated reader antenna; and a plurality of phase converters that are each connected to a portion of the plurality of output connection ports to convert phases of RF signals of corresponding output connection ports.

The plurality of RF switches may each further include a phase controller that controls the plurality of phase converters in order to periodically convert a phase difference between an input and an output of the RF signal of the portion of output connection ports.

DETAILED DESCRIPTION OF THE EMBODIMENTS

Figure 1:
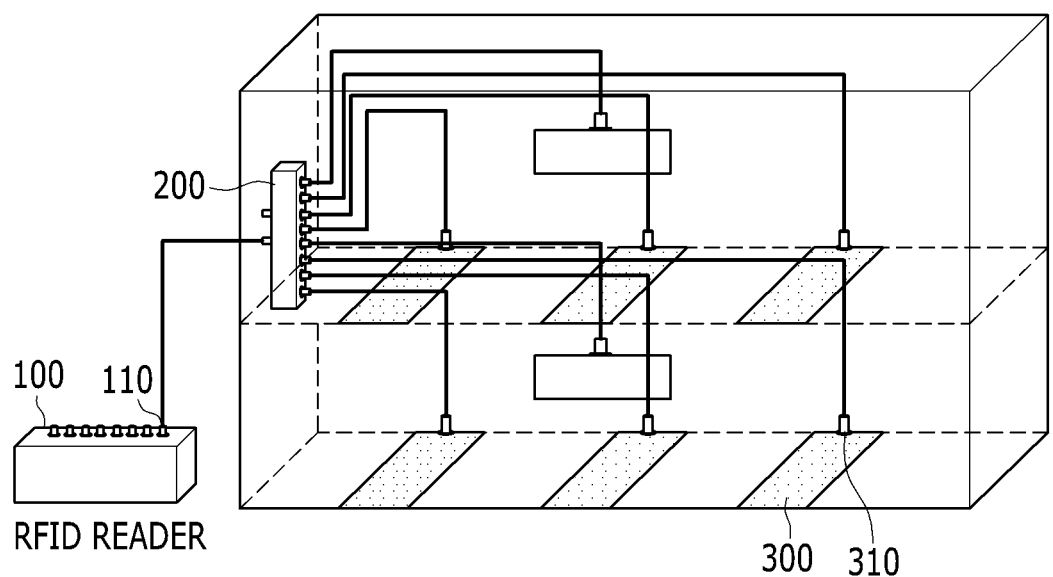
FIG. 1 is a perspective view illustrating an example of an RFID smart shelf system according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, an RF switch, a method of controlling the same, and an RFID smart shelf system according to an exemplary embodiment of the present invention will be described in detail with reference to the drawings.

Figure 2:
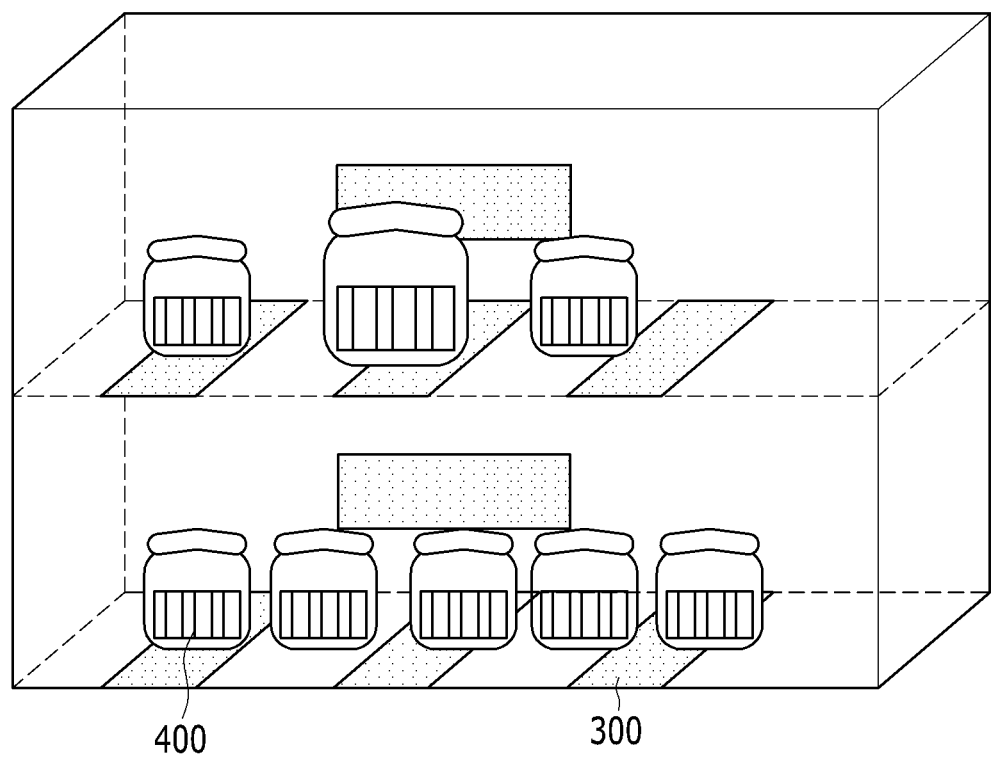
FIG. 2 is a perspective view illustrating an RFID tag of an RFID smart shelf system.

FIG. 1 is a diagram illustrating an example of an RFID smart shelf system according to a first exemplary embodiment of the present invention, and FIG. 2 is a diagram illustrating an RFID tag of an RFID smart shelf system.

Referring to FIGS. 1 and 2, the RFID smart shelf system includes an RFID reader 100, a radio frequency (RF) switch 200, a plurality of reader antennas 300, and a plurality of RFID tags 400.

The RFID reader 100 transmits an RF signal to the plurality of RFID tags 400 and receives a tag signal that responds to the RF signal from the plurality of RFID tags 400.

The RFID reader 100 includes a plurality of antenna ports. At least one of the plurality of antenna ports, for example, an antenna port 110 is connected to the RF switch 200 through a cable. That is, the RFID reader 100 transmits an RF signal to the plurality of RFID tags 400 through the RF switch 200.

The RF switch 200 performs a function of connecting the RFID reader 100 and the plurality of reader antennas 300. Further, the RF switch 200 performs a function of connecting to another RF switch.

The RF switch 200 includes a plurality of input connection ports, for example, two input connection ports 211 and 212, and a plurality of output connection ports, for example, 8 output connection ports 221-228. The input connection port 211 is connected to the RFID reader 100 through a cable, and the input connection port 212 is connected to an RF switch that is connected to another RFID reader 100 through a cable. The output connection ports 221-228 are each connected to corresponding reader antennas 300 through each cable.

The plurality of reader antennas 300 receive an RF signal from the RFID reader 100 through the RF switch 200 using a near field of a specific frequency band, for example, a UHF band (908.5-914 MHz) and radiates the received RF signal to the plurality of RFID tags 400. The plurality of reader antennas 300 may each include an antenna port 310 for connection to the RF switch 200.

In order to improve a recognition rate of the plurality of RFID tags 400, the RF switch 200 controls each of phases of RF signals that are transmitted to the plurality of reader antennas 300, thereby varying a near field that is radiated from the plurality of reader antennas 300.

Some of the plurality of reader antennas 300 may be mounted at a lower end surface and a rear surface of a lower end of the shelf, and the remaining antennas of a plurality of reader antennas 300 may be mounted at an upper end surface and a rear surface of an upper end of the shelf. In this way, as the plurality of reader antennas 300 are uniformly disposed at the shelf, a weak radio area within the shelf can be effectively solved.

The plurality of RFID tags 400 are attached to a plurality of products, respectively, which are put on a shelf that is formed in a plurality of floors, as shown in FIG. 2, and include an intrinsic identification code of a corresponding RFID tag 400 and information that is related to each product. Hereinafter, for convenience of description, both an intrinsic identification code and information that is related to each product are referred to as tag information.

The plurality of RFID tags 400 receive an RF signal that is transmitted from the RFID reader 100, perform backscattered modulation of the received RF signal, and transmit a tag signal including tag information of the plurality of RFID tags 400 to the RFID reader 100.

In such an RFID smart shelf system, the RFID reader 100 transmits an RF signal to the plurality of RFID tags 400 through the RF switch 200, receives tag information from the plurality of RFID tags 400 having received the RF signal, and provides the tag information to a user, and thus the user can manage a product that is put on the shelf.

Hereinafter, as shown in FIG. 1, an example of an RF switch that can be applied to a shelf on which eight reader antennas 300 are mounted and that is formed in two stages will be described with reference to FIG. 3.

Figure 3:
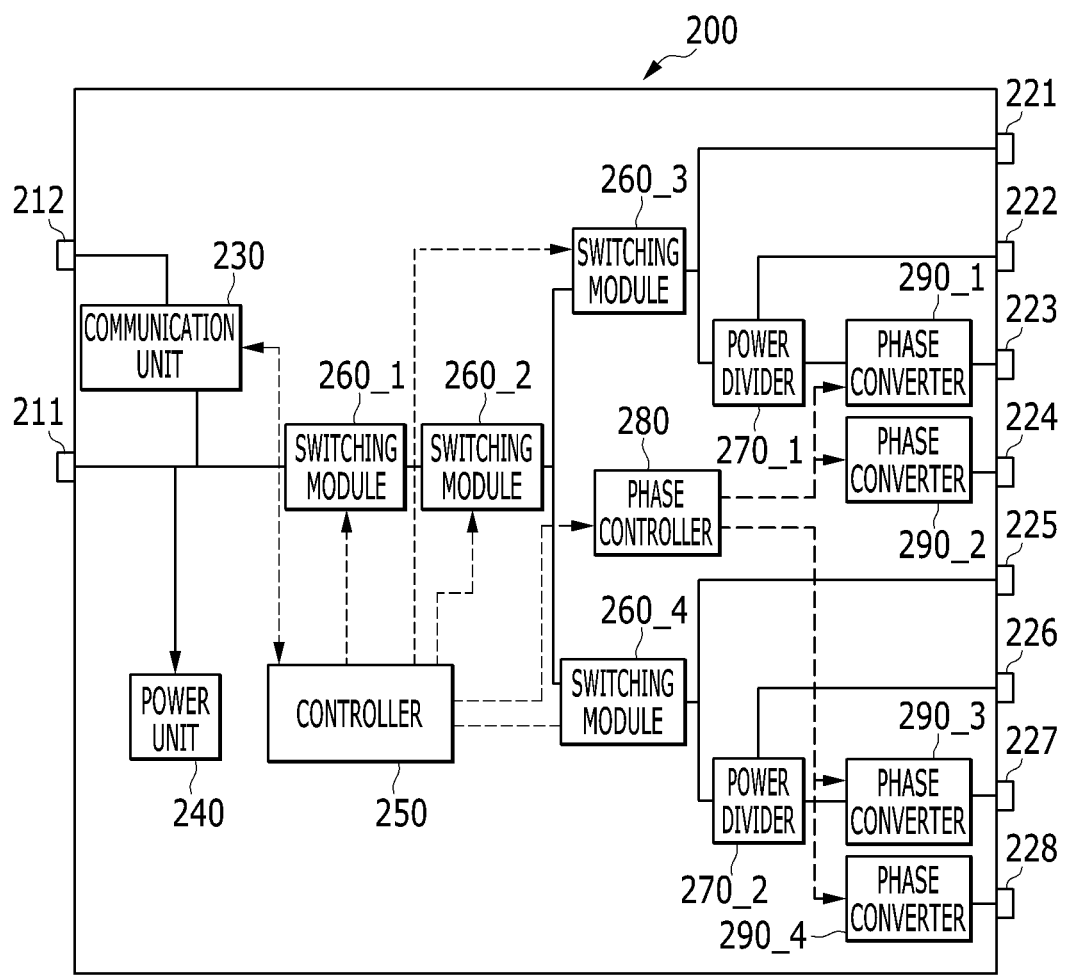
FIG. 3 is a diagram illustrating an RF switch according to a first exemplary embodiment of the present invention.

FIG. 3 is a diagram illustrating an RF switch according to a first exemplary embodiment of the present invention.

Referring to FIG. 3, the RF switch 200 includes a plurality of input connection ports 211 and 212, a plurality of output connection ports 221-228, a communication unit 230, a power unit 240, a controller 250, at least one switching module, for example, four switching modules 260_1, 260_2, 260_3, and 260_4, at least one power divider, for example, two power dividers 270_1 and 270_2, a phase controller 280, and at least one phase converter, for example, four phase converters 290_1, 290_2, 290_3, and 290_4.

The input connection port 211 provides a connection to the RFID reader 100 through a cable, for example, an RF cable, and transmits and receives an RF signal between the RF switch 200 and the RFID reader 100. The input connection port 211 receives a driving power source signal and a control signal of the RF switch 200, and a communication signal with the RFID tag 400 from the RFID reader 100 through a cable, transfers the driving power source signal of the RF switch 200 to the power unit 240, transfers the control signal of the RF switch 200 to the controller 250, and transfers the communication signal with the RFID tag 400 to the communication unit 230.

The input connection port 212 provides a connection to another RF switch that is connected to another RFID reader through a cable, and transmits and receives an RF signal between the another RF switch and the RF switch 200.

The power unit 240 receives a driving power signal from the RFID reader 100 and supplies the driving power signal to the RF switch 200. The power unit 240 converts a driving power signal from the RFID reader 100 to DC power and supplies the DC power to the RF switch 200. Therefore, the power unit 240 may include a DC rectification module (not shown) that converts the driving power signal from the RFID reader 100 to DC power. The power unit 240 may rectify a continuous wave signal that receives from the RFID reader 100 and supply the rectified signal to the RF switch 200. Alternatively, when communication between the RFID reader 100 and the RFID tag 400 is performed, the RFID reader 100 may load and transfer a DC signal that uses as a power source of the RF switch 200 to a continuous wave signal, and the power unit 240 may supply power to the RF switch 200 using a DC signal that is included in a continuous wave signal. A 900 MHz RFID reader may generally transmit power of 1 W, and the transmitting power of the RFID reader 100 may be sufficient to drive the RF switch 200.

The communication unit 230 is used for communication between the RFID reader 100 and the RF switch 200 and between the RF switch 200 and another RF switch, and includes a transmitting unit (not shown) and a receiving unit (not shown).

The receiving unit (not shown) of the communication unit 240 receives a switch control signal of the RF switch 200 from the RFID reader 100 and transfers the switch control signal to the controller 250. The transmitting unit (not shown) of the communication unit 240 transfers a port state signal of the RF switch 200 to the RFID reader 100.

The switch control signal is transferred as a signal of a high or low level from the RFID reader 100, and is transferred in a baseband signal form that is not modulated by a continuous wave signal from the RFID reader 100. The communication unit 230 detects only a baseband signal from the switch control signal from the RFID reader 100, and transfers only the baseband signal to the controller 250. Therefore, the communication unit 230 may include a detector module (not shown) for detecting a baseband signal from the switch control signal from the RFID reader 100.

A port state signal may include identifier (ID) information of the RF switch 200 and antenna sensing information. The RFID reader 100 transmits an RF signal to only a corresponding antenna port of the RF switch 200 through ID information of the RF switch 200 and antenna sensing information, thereby performing communication with the RFID tag 400.

When power is supplied from the power unit 240 to the RF switch 200, the controller 250 starts operation. The controller 250 transfers a switch control signal from the RFID reader 100 to another module within the RF switch 200 through the communication unit 230 and transfers the port state signal of the RF switch 200 to the RFID reader 100 through the communication unit 230. In order to vary a near field within the shelf, the controller 250 transfers a phase control signal to the phase controller 280.

The switching modules 260_1, 260_2, 260_3, and 260_4 switch an RF signal to a designated port so that an RF signal of the RFID reader 100 may pass through the designated port of the plurality of output connection ports 221-228. The RF switch 200 may include at least one switching module according to the number of output connection ports of the RF switch 200, the number of stages (or shelves) of the shelf, and a type of the switching module. In FIG. 3, for connection to eight output connection ports 221-228 and connection to the input connection port 212, four 2-branch switching modules are used, but 1 or 3 or more branch switching modules may be used as the switching module 260.

The switching module 260_1 switches an RF signal to the plurality of output connection ports 221-228 or another RF switch. The switching module 260_2 switches an RF signal to the output connection ports 221-224 corresponding to an upper end of the shelf or to the output connection ports 225-228 corresponding to a lower end of the shelf. The switching module 260_3 switches an RF signal to a designated port of the output connection ports 221-224 corresponding to an upper end of the shelf. The switching module 260_4 switches an RF signal to a designated port of the output connection ports 225-228 corresponding to a lower end of the shelf.

At least one of the power dividers 270_1 and 270_2 may be positioned to correspond to each stage of the shelf, and FIG. 3 illustrates one power divider to correspond to each stage of the shelf. That is, as shown in FIG. 1, in a shelf that is formed in two stages, two power dividers 270_1 and 270_2 may be used.

The power dividers 270_1 and 270_2 divide the same power to at least two paths, and FIG. 3 illustrates a 3-branch power divider that simultaneously supplies the same power to paths that are branched to three using one RF signal as the power divider 270, and another N-branch power divider may be used. N is an integer larger than 0.

The RF switch 200 according to an exemplary embodiment of the present invention controls each of phases of RF signals that are N-branched by the power dividers 270_1 and 270_2 and periodically varies a near field within the shelf.

Specifically, the phase controller 280 converts a phase control signal corresponding to a digital signal that receives from the controller 250 to an analog signal and transfers the analog signal to the plurality of phase converters 290_1, 290_2, 290_3, and 290_4. The phase controller 280 may include a digital-analog conversion module (not shown) that converts a digital signal to an analog signal.

The phase controller 280 sequentially outputs a phase control signal to the phase converters 290_1, 290_2, 290_3, and 290_4. For example, after the phase controller 280 outputs a phase control signal to the phase converters 290_1 and 290_2 corresponding to an upper end of the shelf and adjusts a phase of a corresponding RF signal by the phase converters 290_1 and 290_2, the phase controller 280 may output a phase control signal to the phase converters 290_3 and 290_4 corresponding to a lower end of the shelf.

The phase converters 290_1, 290_2, 290_3, and 290_4 control an amplitude attenuation phase of an RF signal that is output through the power divider 270_1 and 270_2 according to the control of the phase controller 280. In this case, the phase converters 290_1 and 290_2 control a phase of an RF signal that is output through the power divider 270_1, and the phase converters 290_3 and 290_4 control a phase of an RF signal that is output through the power divider 270_1. In this way, the phase converters 290_1 and 290_2/90_3 and 290_4 corresponding to each stage of the shelf determines the number according to a type of the power divider 270_1/270_2. For example, in a 3-branch power divider that simultaneously supplies the same power to a path that is branched to three using one RF signal, two phase converters 290_1 and 290_2/ 290_3 and 290_4 may be used to correspond to each stage, and in this case, three RF signals that are branched by a 3-branch power divider may be controlled in different phases.

In this way, when a phase of an RF signal is changed, a near field of an RF signal that is radiated from the reader antenna 300 that is connected to the output connection ports 221-228 is varied. Therefore, when a tag is attached to a product in which recognition of tag data is weak or when a weak radio area occurs due to a dense environment between tags, a recognition rate of the RFID tag 400 can be improved.

In general, phase control of the phase converters 290_1, 290_2, 290_3, and 290_4 may be divided into an analog method and a digital method. First, the analog method uses an all pass network structure having a relatively small size and having a small change of insertion loss, and this generally uses a characteristic of a varactor diode. The digital method includes a switch line conversion method, a phase conversion method by reflection, a load line method, and a hybrid method. The phase converters 290_1, 290_2, 290_3, and 290_4 convert a phase of an RF signal with such an analog method and digital method.

Figure 4:
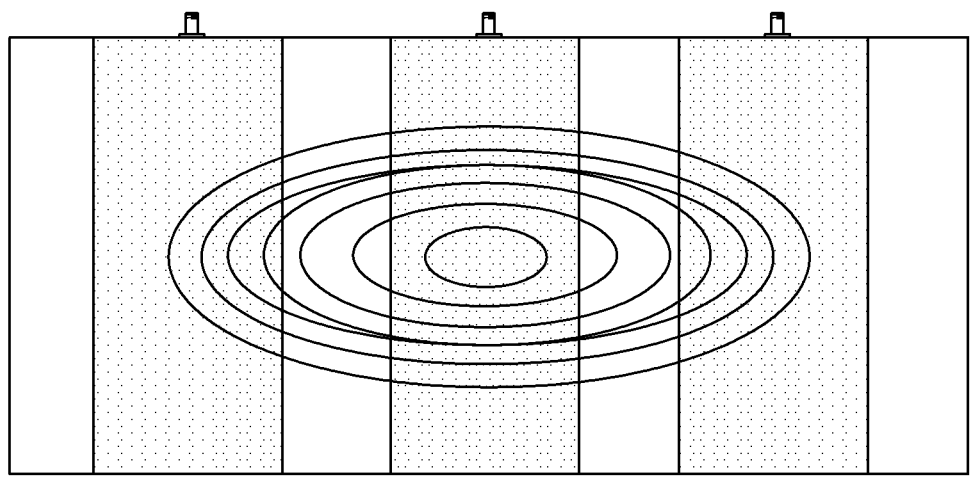
FIGS. 4 and 5 are diagrams illustrating a near field radiation pattern within a shelf.
Figure 5:
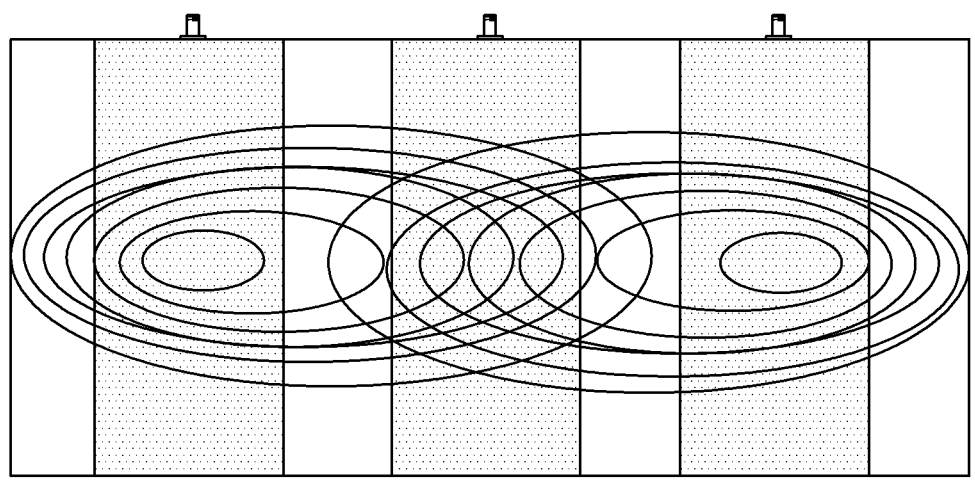

FIGS. 4 and 5 are diagrams illustrating a near field radiation pattern within a shelf, wherein FIG. 4 illustrates a near field radiation pattern when a phase difference does not exist between RF signals that are radiated from three reader antennas that are positioned at a lower end of the shelf, i.e., three reader antennas that are connected to output connection ports 226, 227, and 228 of the RF switch 200, and FIG. 5 illustrates a near field radiation pattern when phases of RF signals that are radiated from three reader antennas that are positioned at a lower end of the shelf are different. Here, a phase difference is a difference between an input phase and an output phase.

When RF signals that are radiated from three reader antennas that are positioned at a lower end of the shelf have the same phase, in a radiation pattern of a near field, field intensity of an intermediate portion is largest and field intensity decreases when advancing to the edge, as shown in FIG. 4.

However, when RF signals that are radiated from 3 reader antennas that are positioned at a lower end of the shelf have different phases, a radiation pattern in a near field is different in a portion having the largest field intensity according to a phase difference, as shown in FIG. 5. In this case, phase differences between RF signals that are radiated from three reader antennas are the same. For example, when a phase difference between RF signals that are radiated from three reader antennas is 0°, −50°, and 50°, or 0°, 50°, and −50°, a radiation pattern of a near field moves to the left side/right side.

Therefore, when varying a near field that is radiated from the plurality of reader antennas 300 that are connected to the RF switch 200 using the RF switch 200, a weak radio area can be removed, and the RFID tag 400 can be more efficiently recognized.

Figure 6:
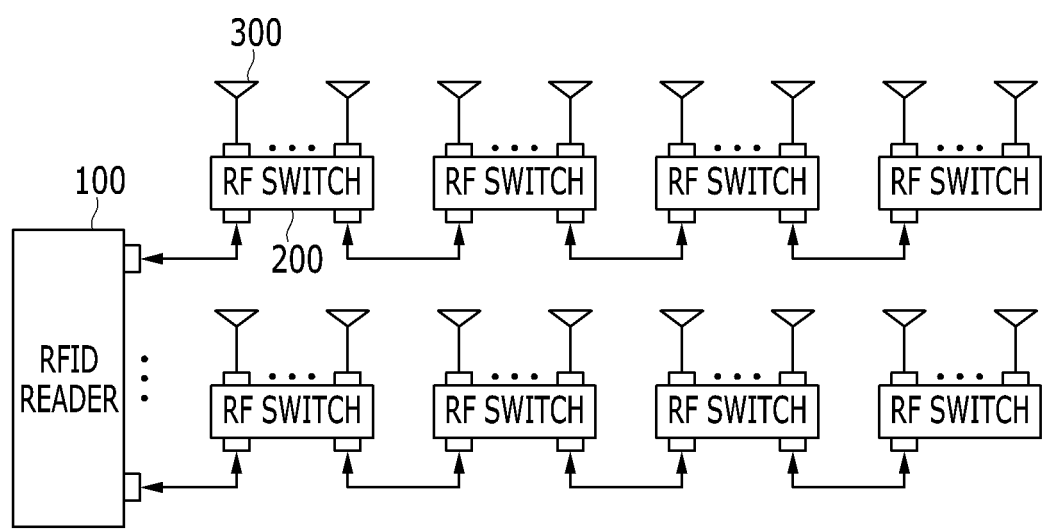
FIG. 6 is a diagram illustrating an example of managing a plurality of shelves through number of the RFID reader using an RF switch according to an exemplary embodiment of the present invention.

FIG. 6 is a diagram illustrating an example of managing a plurality of shelves through the minimum number of the RFID reader using an RF switch according to an exemplary embodiment of the present invention.

A plurality of shelves may be managed using the RF switch 200 according to an exemplary embodiment of the present invention.

One RF switch 200 may be connected through one antenna port of the RFID reader 100, and the one RF switch 200 may be connected to another RF switch through the input connection port 212. In such a method, four RF switches 200 may be connected through one antenna port of the RFID reader 100, as shown in FIG. 6. The one RF switch 200 is connected to the plurality of reader antennas 300 within the shelf through a plurality of output connection ports, and manages a product of the shelf.

Therefore, the RFID reader 100 has antenna ports of the N number, and the one RF switch 200 has output connection ports of the M number, and when RF switches of the L number are connected through one antenna port of the RFID reader 100, the number of reader antennas in which one RFID reader may have becomes a maximum N*M*L.

In this case, when a plurality of reader antennas that are connected to each antenna port of the RFID reader 100 are positioned at each shelf using RF switches of the L number, smart shelves of the N number can be managed through the one RFID reader 100.

Figure 7:
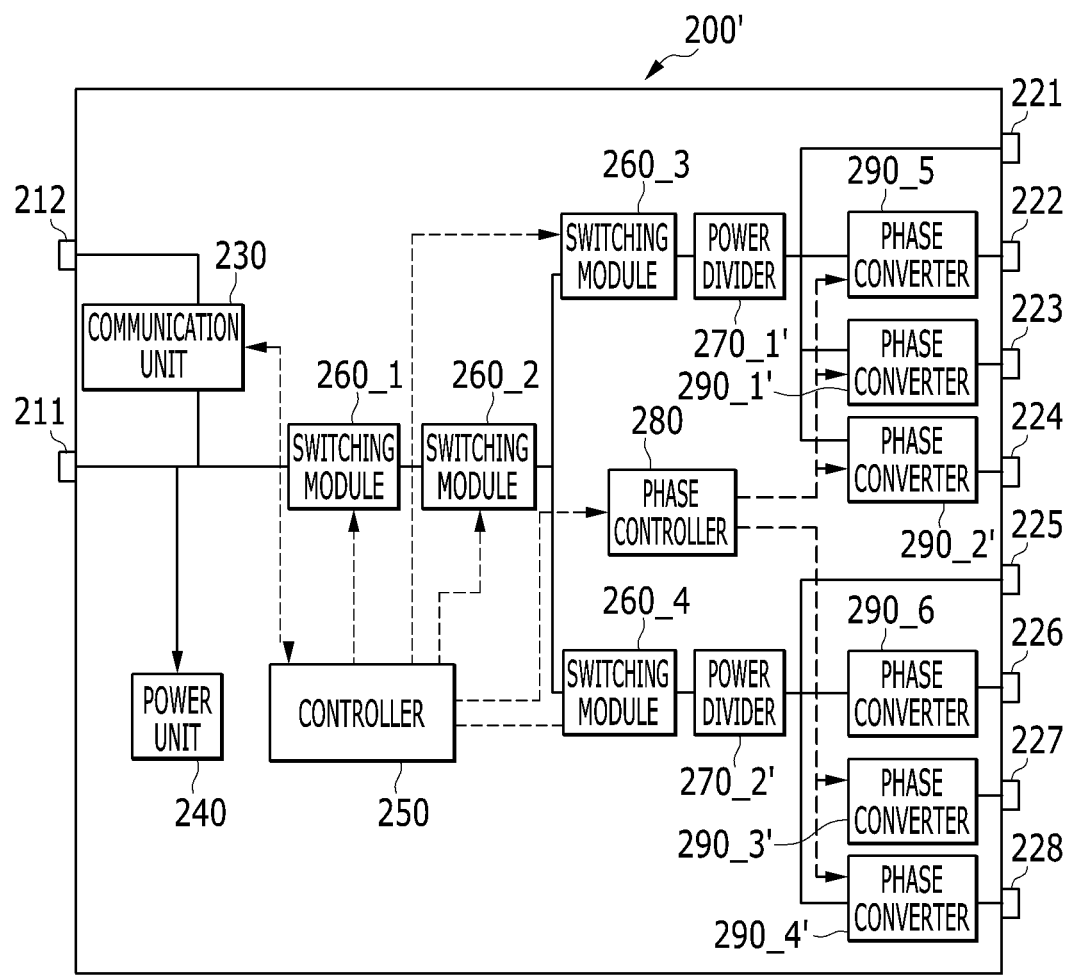
FIG. 7 is a diagram illustrating an RF switch according to a second exemplary embodiment of the present invention.

FIG. 7 is a diagram illustrating an RF switch according to a second exemplary embodiment of the present invention.

Referring to FIG. 7, unlike a case of FIG. 3, an RF switch 200' includes three phase converters 290_1', 290_2', and 290_5/290_3', 290_4', and 290_6 corresponding to 4-branch power dividers 270_1' and 270_2', and one 4-branch power divider 270_1'/270_2'.

Thereby, phases of four RF signals that are simultaneously branched by the 4-by branch power divider 270_1'/270_2' may be differently controlled, and a near field that is radiated from the plurality of reader antennas 300 that are connected to four output connection ports 221-224/225-228 may be varied.

That is, unlike a case of FIG. 3, in order to obtain four RF signals of the same amplitude, the RF switch 200' uses the 4-branch power divider 270_1'/270_2' and adjusts a phase difference between RF signals that are radiated through the reader antenna 300 using three phase converters 290_1', 290_2', and 290_5/290_3', 290_4', and 290_6 corresponding to one 4-branch power divider 270_1'/270_2'. For example, the RF switch 200' may periodically adjust a phase difference between RF signals that are radiated from four reader antennas like 0°, −50°, 50°, and 100°, and 0°, 50°, −50°, and −100°. In this way, when a phase difference between RF signals that are radiated from four reader antennas is periodically adjusted like 0°, −50°, 50°, and 100°, and 0°, 50°, −50°, and −100°, intensity of a radiation field of a near field within the shelf may be periodically varied to the left side or to the right side.

Figure 8:
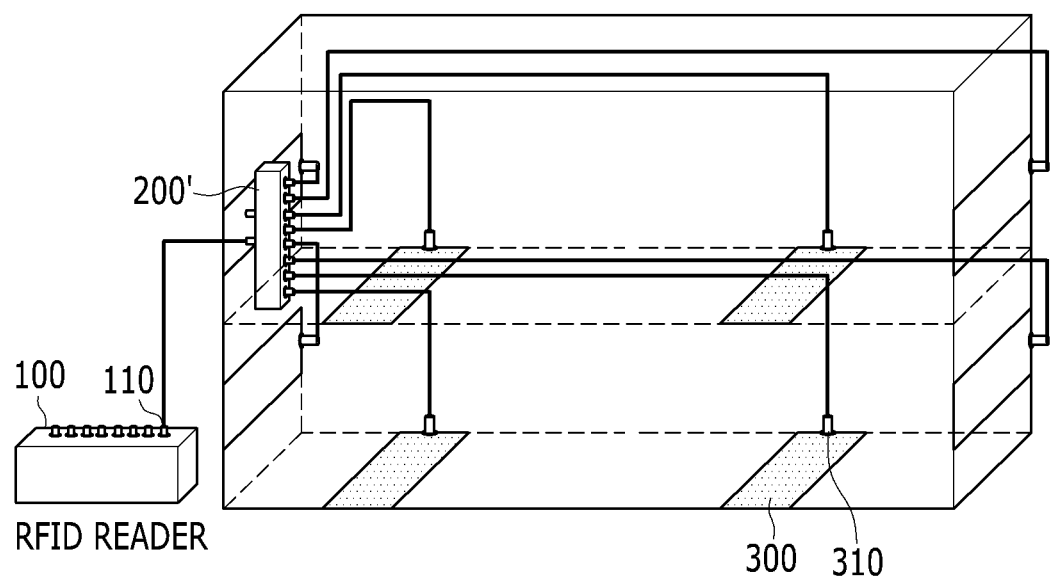
FIG. 8 is a perspective view illustrating an example of an RFID smart shelf system according to a second exemplary embodiment of the present invention.

FIG. 8 is a perspective view illustrating an example of an RFID smart shelf system according to a second exemplary embodiment of the present invention.

As shown in FIG. 7, the RFID smart shelf system that is shown in FIG. 8 can be applied to a structure that controls a phase of RF signals that are output through four output connection ports 221-224/225-228 within the RF switch 200' and that varies a near field within the shelf and can be applied even to the RF switch 200 that is shown in FIG. 1. Unlike a case of FIG. 1, in such an RFID smart shelf system, two reader antennas are mounted at each of a lower end surface and an upper end surface of the shelf, and two reader antennas are mounted at each of a left/right side surface of the shelf, and thus a near field is varied using a total of eight reader antennas. Alternatively, two reader antennas may be mounted at a lower end surface, and two reader antennas may be mounted at each rear surface of a lower end and an upper end of the shelf.

Hereinafter, operation in an RFID electron beam group system according to an exemplary embodiment of the present invention will be described in detail with reference to FIGS. 9 to 11.

Figure 9:
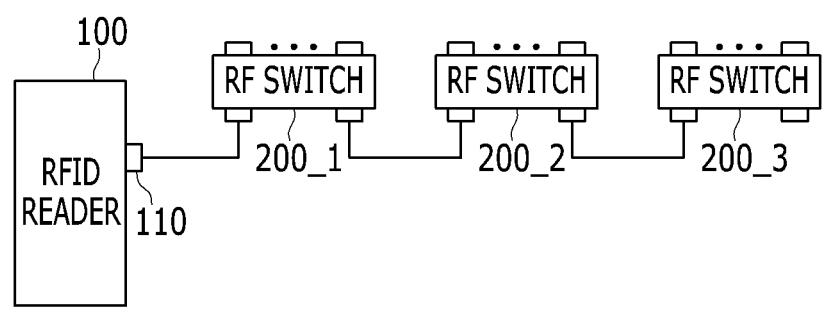
FIG. 9 is a diagram illustrating an example of an RFID smart shelf system for explaining operation of an RFID smart shelf system according to an exemplary embodiment of the present invention.

FIG. 9 is a diagram illustrating an example of an RFID smart shelf system for explaining operation of an RFID smart shelf system according to an exemplary embodiment of the present invention.

First, in order to describe operation of an RFID smart shelf system according to an exemplary embodiment of the present invention, as shown in FIG. 9, it is assumed that three RF switches 200_1, 200_2, and 200_3 are connected to one antenna port 110 of the RFID reader 100. It is assumed that the three RF switches 200_1, 200_2, and 200_3 have a structure of the RF switch 200 of FIG. 1.

Figure 10:
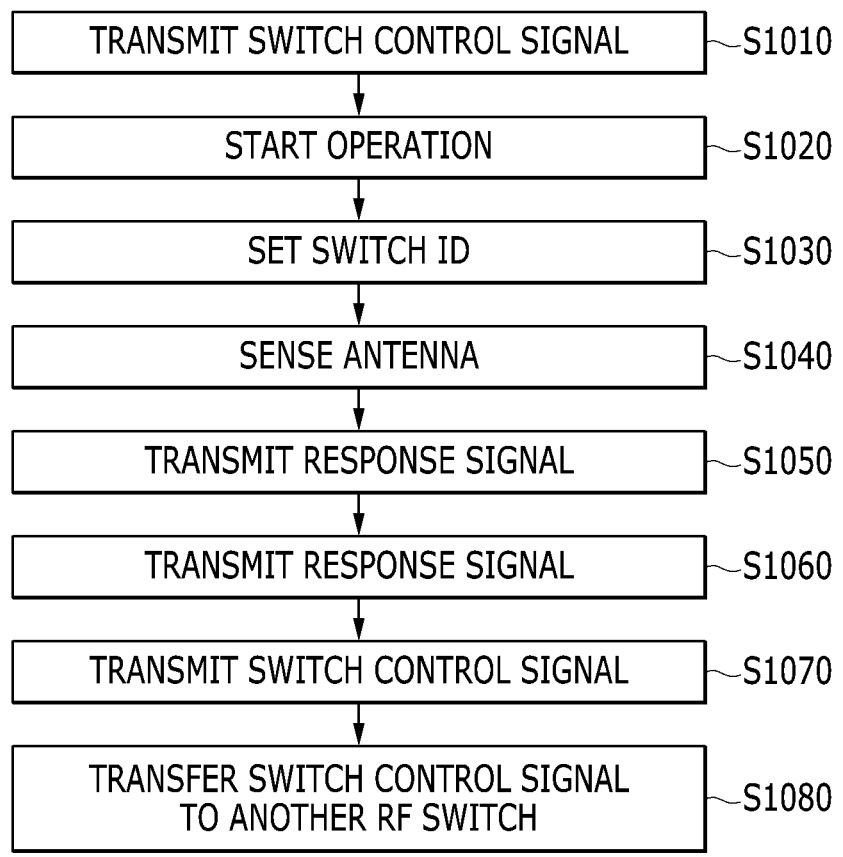
FIG. 10 is a flowchart illustrating operation of an RFID smart shelf system according to an exemplary embodiment of the present invention.

FIG. 10 is a flowchart illustrating operation of an RFID smart shelf system according to an exemplary embodiment of the present invention and illustrates, particularly, operation for initialization of the RF switches 200_1, 200_2, and 200_3.

Referring to FIG. 10, for communication between the RFID reader 100 and the RFID tag 400, the RFID reader 100 should know state information of the RF switches 200_1, 200_2, and 200_3 that are connected to the antenna port 110 and a reader antenna that is connected to the RF switches 200_1, 200_2, and 200_3.

For communication with the RF switches 200_1, 200_2, and 200_3, the RFID reader 100 enters an initial setting step. The RFID reader 100 transmits a switch control signal to the RF switch 200_1 through a cable. Accordingly, the RF switch 200_1, having received a switch control signal receives power through DC rectification and starts operation. In this case, the switch control signal may include switch ID to set.

The RF switches 200_1, 200_2, and 200_3 may be initially set to the same default ID. Therefore, when the RFID reader 100 transmits a switch control signal to the RF switch 200_1 with default ID (S1010), the RF switch 200_1 that is positioned at the front receives power through DC rectification and starts operation (S1020), sets switch ID to another value, for example, a value such as "0x01" (S1030), and transmits a response signal to the RFID reader 100 (S1050). A response may include switch ID in which the RF switch 200_1 sets and antenna sensing information. The RF switch 200_1 determines whether a reader antenna is connected through an antenna sensing process (S1040), and antenna sensing information may include ID of the reader antenna that is connected to the RF switch 200_1 and information of an output connection port. The controller 250 of the RF switch 200_1 transfers a predetermined DC signal to a plurality of output connection ports 221-228, detects a voltage change of the DC signal, and determines the reader antenna 300 that is connected to the RF switch 200_1. Alternatively, the controller 250 of the RF switch 200_1 may transfer a predetermined AC signal to a plurality of output connection ports 221-228, detect a quantity of reflected signals, and determine the reader antenna 300 that is connected to the RF switch 200_1.

Antenna sensing information may include antenna ID of a reader antenna that is connected to the RF switch 200_1. Thereafter, the RF switch 200_1 opens a path to a next RF switch 200_2 through the switching module 260_1 (S1060).

Next, when the RFID reader 100 transmits a switch control signal to the RF switch 200_1 with default ID (S1070), the default ID is changed to another switch ID in the RF switch 200_1, and thus the RF switch 200_1 transfers the switch control signal to the RF switch 200_2 (S1080). Thereafter, the RF switch 200_2 that is set to the default ID sets the switch ID to another value, for example, a value such as 0x02, according to a switch control signal and responds to the RFID reader 100. The RF switch 200_2 receives power through DC rectification and starts operation. Similarly, the response may include the set switch ID and antenna sensing information. The RF switch 200_2 determines whether a reader antenna is connected through an antenna sensing process, and antenna sensing information may include ID of the reader antenna that is connected to the RF switch 200_2 and information of an output connection port. Thereafter, the RF switch 200_2 opens a path to a next RF switch 200_3 through the switching module 260_1. In such a method, the RF switches 200_1, 200_2, and 200_3 open a signal path to another RF switch that is connected thereto while receiving new switch ID from the RFID reader 100. The RFID reader 100 receives a response to a switch control signal from the RF switches 200_1, 200_2, and 200_3 and determines the number of RF switches 200_1, 2002, and 200_3 that are connected to one antenna port and a reader antenna that is connected to the RF switches 200_1, 200_2, and 200_3.

The RFID reader 100 displays output connection port information and antenna ID of the RF switch 200_1, 200_2, and 200_3 to show the antenna ID and the output connection port information to a user.

In FIG. 10, the RFID reader 100 simultaneously receives switch IDs of each of the RF switches 200_1, 200_2, and 200_3 and antenna sensing information through a response of a switch control signal, but after the switch IDs of the RF switches 200_1, 200_2, and 200_3 are set, the RFID reader 100 may transmit an antenna sensing command to the RF switches 200_1, 200_2, and 200_3, and receive corresponding antenna sensing information from the RF switches 200_1, 200_2, and 200_3, having received the antenna sensing command.

Thereby, an initialization step of the RF switches 200_1, 200_2, and 200_3 may be complete. When an initialization step is complete, the RFID reader 100 sequentially designates an output connection port corresponding to the RF switches 200_1, 200_2, and 200_3 and transfers a command through the output connection port, thereby performing communication with the RFID tag 400. Hereinafter, for convenience of description, it is assumed that an antenna port corresponding to RF switches 200_1, 200_2, and 200_3 is set to a first antenna port. The RFID reader 100 recognizes a plurality of RFID tags without an extension of the RFID reader 100 through all reader antennas that are connected to an antenna port through a repeated process.

Figure 11:
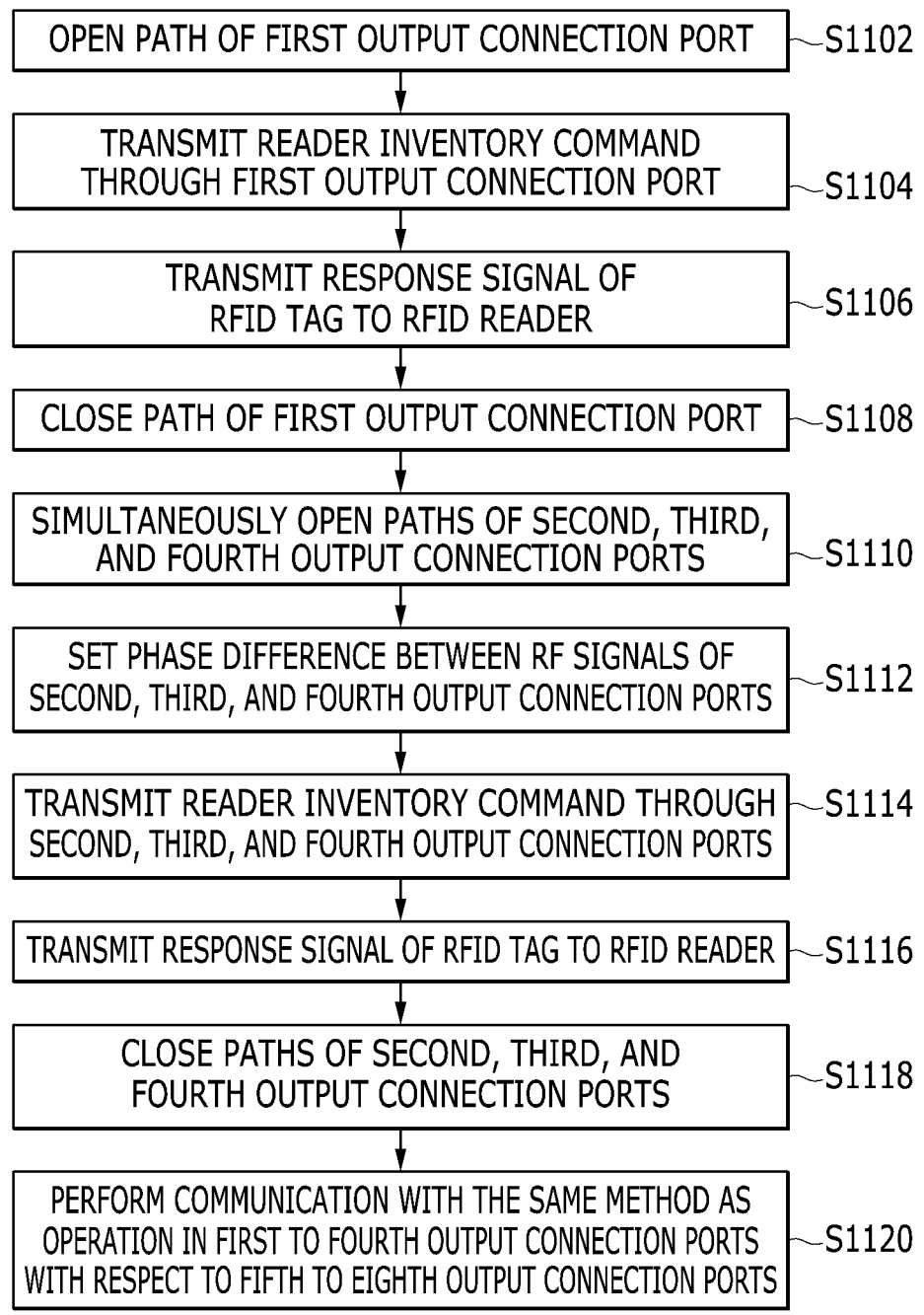
FIG. 11 is a flowchart illustrating a communication method between an RFID reader and an RF switch according to an exemplary embodiment of the present invention.

FIG. 11 is a flowchart illustrating a communication method between an RFID reader and an RF switch according to an exemplary embodiment of the present invention.

For convenience, FIG. 11 illustrates only operation of the RF switch 200_1, but other RF switches 200_2 and 200_3 may operate similarly to the RF switch 200_1. As described below, the RF switches 200_1, 200_2, and 200_3 sequentially operate instead of simultaneously operating.

Referring to FIG. 11, the RFID reader 100 opens a path of a first output connection port for connection to the first RF switch 200_1 (S1102). The first RF switch 200_1 transmits a reader inventory command from the RFID reader 100 through the first output connection port (S1104), and when a peripheral RFID tag 400 responds to the reader inventory command, the first RF switch 200_1 transmits a response signal of the RFID tag to the RFID reader 100 (S1106), thereby performing communication with the RFID tag 400.

Thereafter, the RFID reader 100 closes the path of the first output connection port (S1108).

Next, the RFID reader 102 simultaneously opens second, third, and fourth output connection ports of the first RF switch 200_1 (S1110). That is, because RF signals to the second, third, and fourth output connection ports are simultaneously output by the power divider 170_1, the RFID reader 100 simultaneously opens the second, third, and fourth output connection ports of the first RF switch 200_1.

The controller 250 of the first RF switch 200_1 operates the phase controller 280, and the phase controller 280 controls the phase converters 290_1 and 290_2 according to a phase control signal that it receives from the controller 250. The phase converters 290_1 and 290_2 each set difference phases of RF signals of corresponding output connection ports according to the control of the phase controller 280 (S1112).

In this way, after a phase difference between RF signals of second, third, and fourth output connection ports is set, the RFID reader 100 transmits a reader inventory command through second, third, and fourth output connection ports of the first RF switch 200_1 (S1114), and the peripheral RFID tag 400 transmits a response signal of the RFID tag to the RFID reader 100 in response to the reader inventory command and thus the RFID reader 100 performs communication with the RFID tag 400 (S1116). In this case, a phase difference between the RF signals that are radiated from the second, third, and fourth output connection ports of the RF switch 200_1 may be simultaneously set and varied to several values. For example, after a phase difference between the RF signals of the second output connection port is set to 0°, a phase difference between the RF signals of the third output connection port is set to −50°, and a phase difference between the RF signals of the fourth output connection port is set to 50°, the RFID reader 100 transmits a reader inventory command, thereby performing communication with the peripheral RFID tag 400. Next, after a phase difference between the RF signals of the second output connection port is set to 0°, a phase difference between the RF signals of the third output connection port is set to 50°, and a phase difference between the RF signals of the fourth output connection port is set to −50°, the RFID reader 100 transmits a reader inventory command, thereby performing communication with the peripheral RFID tag 400. Next, after a phase difference between the RF signals of the second output connection port is set to 0°, a phase difference between the RF signals of the third output connection port is set to −50°, and a phase difference between the RF signals of the fourth output connection port is set to 50°, the RFID reader 100 transmits a reader inventory command, thereby performing communication with the peripheral RFID tag 400.

Thereafter, the RFID reader 100 closes paths of the second, third, and fourth output connection ports (S1118).

Thereafter, in the fifth to eighth output connection ports, communication is performed with the same method as operation in the first to fourth output connection ports (S1120). Therefore, a near field that is radiated from the reader antenna 300 within the shelf is varied and thus a recognition rate of a tag that is attached to a product (metal, liquid, etc.) that is exhibited on the shelf and that is weak in an electromagnetic wave environment is improved, and a weak radio area between tags due to a dense environment is solved, and thus an RFID tag can be more efficiently recognized.

The RFID reader 100 performs communication with an output connection port that is connected to the second RF switch 200_2 with the same method as that of the first RF switch 200_1 through the above process, and after communication with an output connection port that is connected to the second RF switch 200_2 is complete, the RFID reader 100 performs communication with an output connection port that is connected to a final RF switch 200_3. When communication through a final output connection port is complete, all communication processes with the RFID tag 400 are terminated.

According to an exemplary embodiment of the present invention, a recognition rate of a tag that is attached to a product (metal, liquid, etc.) that is exhibited on a smart shelf and that is weak in an electromagnetic wave environment can be improved, and a weak radio area between tags due to an dense environment can be eliminated. Accordingly, an RFID tag can be more efficiently recognized.

Further, by using an RF switch, a plurality of smart shelves in which a large number of products are exhibited can be managed through the minimum number of RFID reader, and an RFID smart shelf system can be constructed without increasing the number of expensive readers and host PCs.

An exemplary embodiment of the present invention may not only be embodied through the above-described apparatus and/or method, but may also embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio frequency (RF) switch that is connected between a radio frequency identification (RFID) reader and a plurality of reader antennas, the RF switch comprising:
   a first input connection port that sets a connection to the RFID reader;
   a second input connection port that sets a connection to another RF switch;

a plurality of output connection ports that set a connection to a plurality of reader antennas, respectively;
a plurality of switching modules that transfer an RF signal of the RFID reader to a designated reader antenna of the plurality of reader antennas; and
a plurality of phase converters that are each connected to a portion of the plurality of output connection ports to convert phases of RF signals of corresponding output connection ports; and
a phase controller that controls the plurality of phase converters in order to periodically vary a phase difference between an input and an output of the RF signals of the portion of output connection ports;
wherein the phase controller outputs a first phase control signal to a first subset of the plurality of phase converters corresponding to a first location on a structure configured with a first subset of the plurality of reader antennas, and outputs a second phase control signal to a second subset, different from the first, of the plurality of phase converters corresponding to a second location on the structure configured with a second subset, different from the first, of the plurality of reader antennas.

2. The RF switch of claim 1, further comprising a power divider that branches an RF signal from at least one of the plurality of switching modules with the same power and that outputs the RF signal to the portion of output connection ports.

3. The RF switch of claim 1, further comprising a power unit that supplies power to the RF switch through the RF signal that is received from the RF reader.

4. The RF switch of claim 1, wherein the RF signal comprises a continuous wave signal, and
the continuous wave signal is used as power for the RF switch.

5. The RF switch of claim 1, wherein the RF signal comprises a switch control signal comprising a switch identifier, and
wherein the RF switch further comprises a switch controller that changes a preset default identifier to the switch identifier when the switch control signal is received.

6. The RF switch of claim 1, wherein the RF signal comprises an antenna sensing command, and
wherein the RF switch further comprises a switch controller that transmits an antenna identifier of a reader antenna that is connected to the RF switch and information of an output connection port to which the reader antenna is connected to the RF reader when the antenna sensing command is received.

7. The RF switch of claim 6, wherein the switch controller transfers a DC signal to the plurality of output connection ports, and determines a reader antenna that is connected to the RF switch through a voltage change of the DC signal.

8. The RF switch of claim 6, wherein the switch controller transfers an AC signal to the plurality of output connection ports, and determines a reader antenna that is connected to the RF switch through a quantity of a reflected signal.

9. A method of controlling communication between an RFID reader and a plurality of reader antennas in an RF switch that is connected between one antenna port of the RFID reader and the plurality of reader antennas, the method comprising:
transmitting an RF signal by opening at least one first output connection port of a plurality of output connection ports that provide a connection to the plurality of reader antennas;
closing the at least one first output connection port;
transmitting an RF signal by opening at least one second output connection port of the plurality of output connection ports; and
closing the at least one second output connection port;
wherein the transmitting of an RF signal by opening at least one first output connection port comprises periodically varying a phase difference between an input and an output of an RF signal of the at least one first output connection port; and
wherein the method further comprises:
outputting a first phase control signal to a first subset of a plurality of phase converters corresponding to a first location on a structure configured with a first subset of the plurality of reader antennas, and
outputting a second phase control signal to a second subset, different from the first, of the plurality of phase converters corresponding to a second location on the structure configured with a second subset, different from the first, of the plurality of reader antennas.

10. The method of claim 9, wherein the periodically varying of a phase difference comprises:
differently setting phase differences between RF signals of the at least one first output connection port or the at least one second output connection port; and
transmitting the RF signal through the at least one first output connection port or the at least one second output connection port.

11. The method of claim 9, wherein the transmitting of an RF signal by opening at least one second output connection port comprises periodically varying a phase difference between an input and an output of an RF signal of the at least one second output connection port.

12. The method of claim 9, further comprising,
before the transmitting of an RF signal by opening at least one first output connection port:
setting an initial default identifier to a switch identifier according to an initial setting request comprising the switch identifier from the RFID reader;
determining a reader antenna that is connected to the RF switch through antenna sensing; and
transmitting an identifier of the reader antenna that is connected to the RF switch and information of an output connection port that provides a connection to the reader antenna to the RFID reader.

13. The method of claim 12, wherein the setting of an initial default identifier, when another RF switch is connected to the RF switch, comprises:
opening a connection path to the another RF switch; and
transferring, when an initial setting request comprising another switch identifier is received from the RF reader, the initial setting request comprising the other switch identifier to the another RF switch.

14. An RFID smart shelf system that manages a product through communication with an RFID tag that is attached to the product within a shelf, the RFID smart shelf system comprising:
a plurality of reader antennas that are mounted on the shelf;
an RFID reader comprising at least one antenna port and that receives information of the product through communication with the RFID tag; and
a plurality of RF switches that transmit and receive an RF signal between one antenna port of the RFID reader and the plurality of reader antennas and that are sequentially connected between one antenna port of the RFID reader and the plurality of reader antennas;

wherein the plurality of RF switches each comprise:
a plurality of output connection ports that each set a connection to a portion of the plurality of reader antennas;
a plurality of phase converters that are each connected to a portion of the plurality of output connection ports to convert phases of RF signals of corresponding output connection ports; and
a phase controller that controls the plurality of phase converters in order to periodically vary a phase difference between an input and an output of the RF signal of the portion of output connection ports;
wherein the phase controller outputs a first phase control signal to a first subset of the plurality of phase converters corresponding to a first location on the shelf configured with a first subset of the plurality of reader antennas, and outputs a second phase control signal to a second subset, different from the first, of the plurality of phase converters corresponding to a second location on the shelf configured with a second subset, different from the first, of the plurality of reader antennas.

15. The RFID smart shelf system of claim 14, wherein the plurality of RF switches each further comprise:
a first input connection port that sets a connection to the RFID reader;
a second input connection port that sets a connection to another RF switch; and
a plurality of switching modules that transfer the RF signal of the RFID reader to a designated reader antenna.

16. The RFID smart shelf system of claim 14, wherein the plurality of RF switches each perform a communication process that transmits an RF signal by opening at least one first output connection port of the plurality of output connection ports and that closes the at least one first output connection port, and that transmits an RF signal by opening at least one second output connection port of the plurality of output connection ports and that closes the at least one second output connection port, and
the plurality of RF switches sequentially perform the communication process.

17. The RFID smart shelf system of claim 14, wherein each of the plurality of RF switches further comprise a switch controller that sets each of initial default identifiers to corresponding switch identifiers according to an initial setting request from the RFID reader and that transmits an identifier of the reader antenna that is connected to the RF switch and information of an output connection port that provides a connection to the reader antenna to the RFID reader through antenna sensing.

18. The RF switch of claim 1, at least one of the first or second subsets of the plurality of reader antennas radiating, in response to at least one of the first or second phase control signals, a near field pattern corresponding to a plurality of differing phases of the RF signals, wherein a largest field intensity of the near field pattern moves from one side to another side.

* * * * *